Aug. 26, 1930.   H. C. SEELEY   1,773,875
SEAT MOUNTING
Filed Dec. 31, 1928   4 Sheets-Sheet 2

INVENTOR
Hugh C. Seeley
By
Geo. B. Pitts
ATTORNEY

Aug. 26, 1930.     H. C. SEELEY     1,773,875
SEAT MOUNTING
Filed Dec. 31, 1928     4 Sheets-Sheet 3

INVENTOR
Hugh C. Seeley
BY
Geo. B. Witts
ATTORNEY

Aug. 26, 1930.  H. C. SEELEY  1,773,875
SEAT MOUNTING
Filed Dec. 31, 1928  4 Sheets-Sheet 4
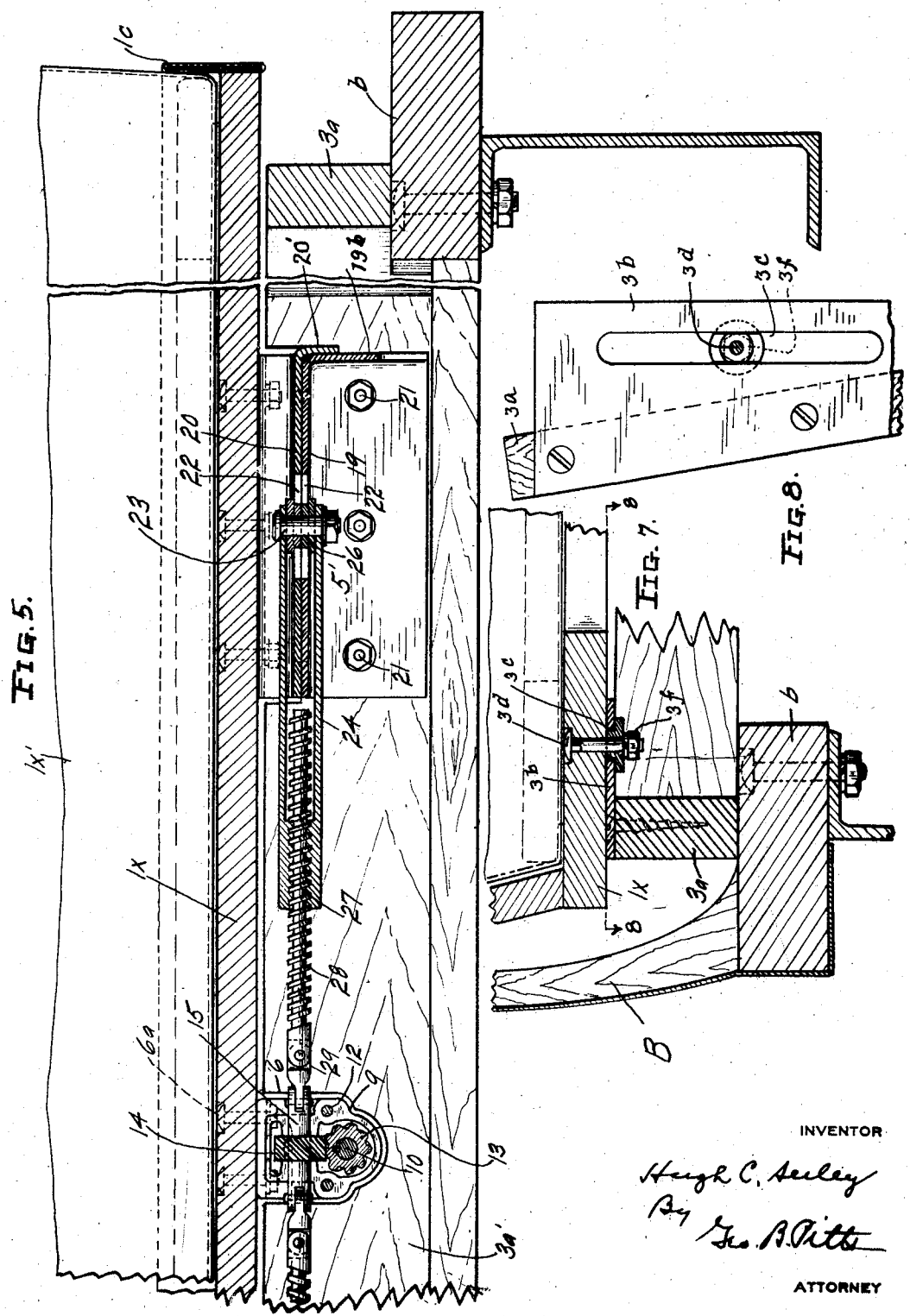
INVENTOR
Hugh C. Seeley
By Geo. B. Pitts
ATTORNEY Patented Aug. 26, 1930

1,773,875

UNITED STATES PATENT OFFICE

HUGH C. SEELEY, OF CLEVELAND, OHIO, ASSIGNOR TO THE BAKER-RAULANG COMPANY, OF CLEVELAND, OHIO, A CORPORATION OF OHIO

SEAT MOUNTING

Application filed December 31, 1928. Serial No. 329,569.

This invention relates to a seat construction, more particularly to the mounting for the seat, whereby it may be moved to different positions, for example, forwardly or backwardly, toward and from the foot controls of a vehicle, as well as its steering device.

One object of the invention is to provide a seat mounting which is relatively simple and capable of positive operation to move the seat any desired distance within the limits of its movement in either direction.

Another object of the invention is to provide a seat mounting capable of ready adjustment when occupied without undue exertion or manual effort.

A further object is to construct a seat mounting wherein adjustment is effected without danger of either end or side of the seat wedging in its guides.

Other objects of the invention will be apparent to those skilled in the art to which my invention relates from the following description taken in connection with the accompanying drawings, wherein Fig. 1 is a side view of a vehicle, with parts broken away and showing a seat within the vehicle having a mounting embodying my invention.

Fig. 4 is a section on the line 4—4 of Fig. 3.

Fig. 5 is a fragmentary section on the line 5—5 of Fig. 4.

Fig. 6 is a section on the line 6—6 of Fig. 3.

Fig. 7 is a section on the line 7—7 of Fig. 3.

Fig. 8 is a fragmentary section on the line 8—8 of Fig. 7.

Figure 1:
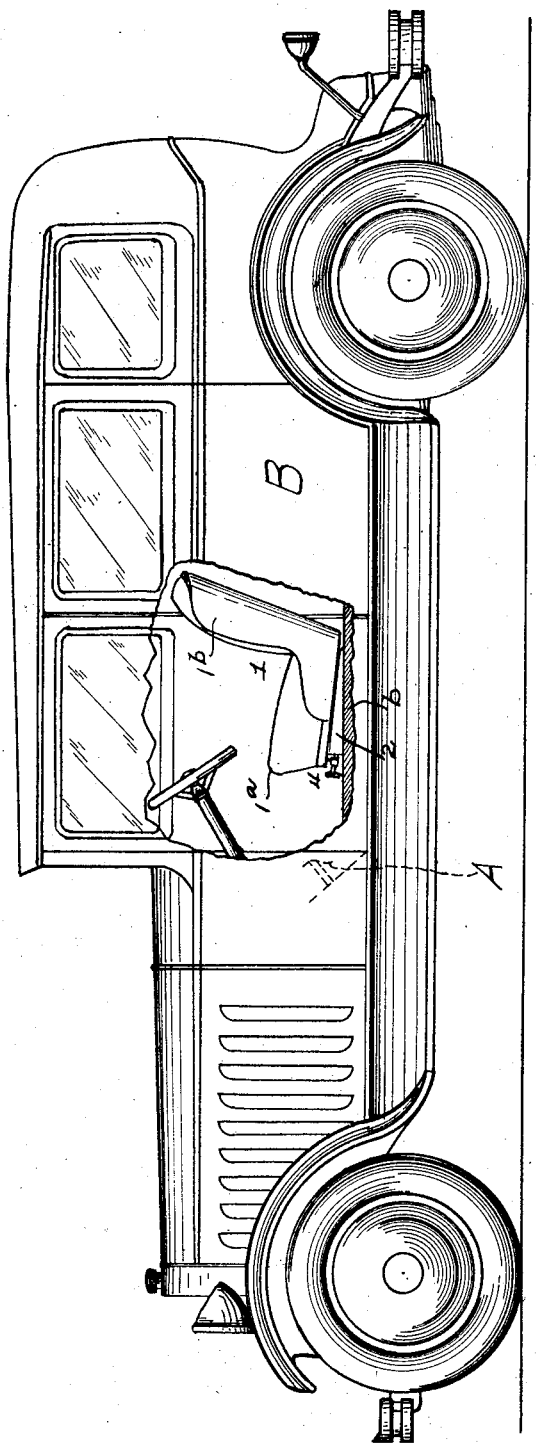
Figure 2:
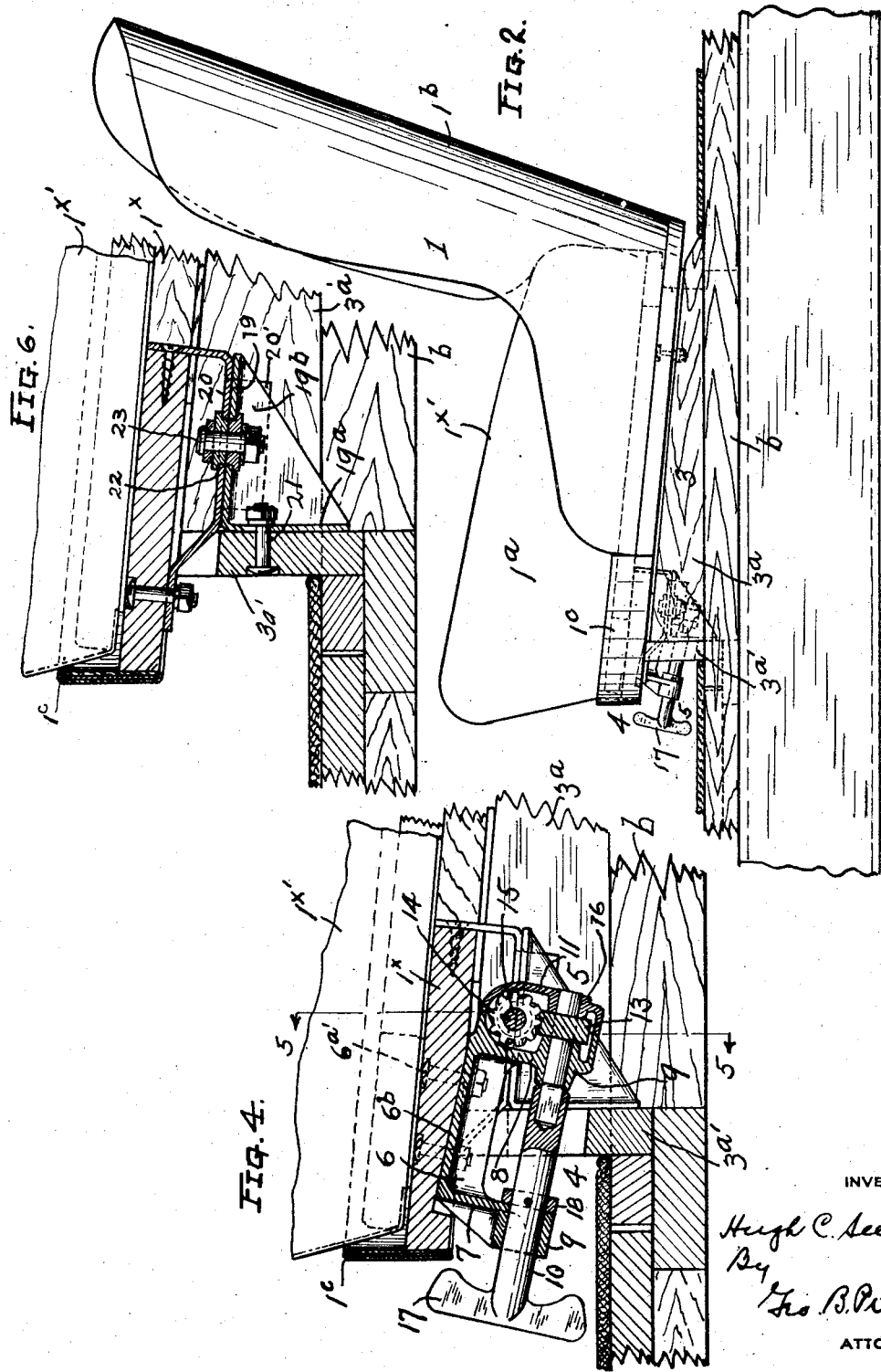
Fig. 2 is a fragmentary view of parts shown in Fig. 1, enlarged, the seat and its mounting being shown in side elevation.
Figure 3:
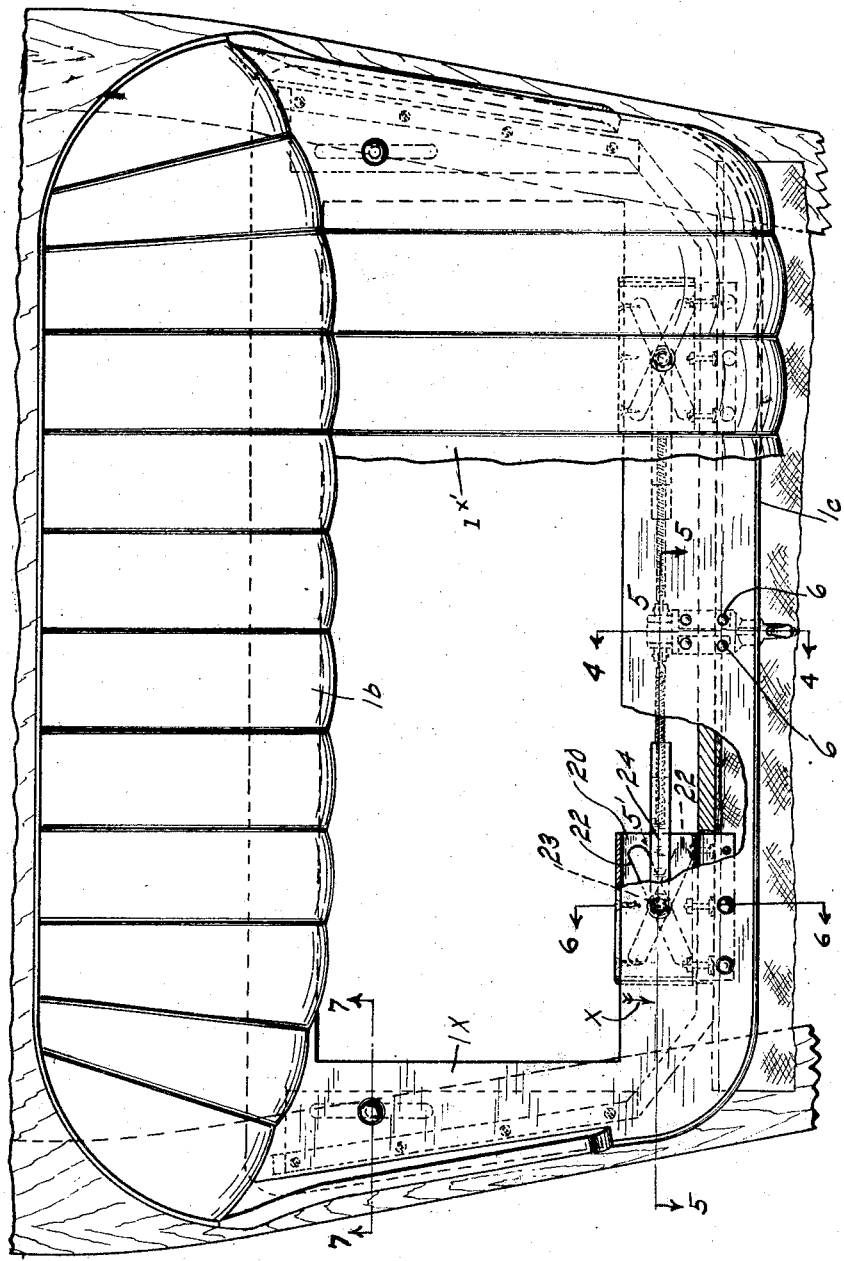
Fig. 3 is a plan view of the parts shown in Fig. 2 with parts broken away.

In the drawings, 1 indicates as an entirety a seat and 2 indicates as an entirety its mounting. The seat comprises a bottom $1^a$ and a back $1^b$. The bottom $1^a$ may consist of a base $1^x$, preferably a frame of substantially rectangular form as shown in Fig. 3, and a cushion $1^{x'}$. The cushion may be removable and held in place by a flange $1^c$. The back $1^b$ may be of any desired construction and associated in any desired manner with the bottom $1^a$, but it will be understood that so far as my invention is concerned the back is not an essential part of the seat and may be omitted. I have applied my invention to vehicles where an adjustable seat has many advantages, and in the operation of the vehicle it is customary as well as advantageous to the driver to utilize the seat back as an abutment when applying pressure to the foot controls A; in this chosen application of my invention the back is an incidental part of the seat and has its utility in connection therewith.

The mounting 2 comprises a support 3 on or relative to which the seat 1 slides and an adjustment mechanism indicated as an entirety at 4, for moving the seat in either direction relative to the support. The support 3 is preferably inclined, as shown, to give a slight inclination to the seat 1. The support 3 may consist of side sections $3^a$ and a front section $3^{a'}$, each formed of wood, steel or other material and suitably secured to structural members $b$ of the vehicle B or its body, the side sections $3^a$ being in spaced relation.

Suitable guides are provided between the seat 1 and its mounting 2, these guides being preferably disposed between the end sections of the base $1^x$ and the side sections $3^a$. Where the latter are formed of wood, I provide thereon metal plates $3^b$. The plates $3^b$ are secured to the upper edges of the side sections $3^a$ and extend inwardly therefrom and each is formed in its extended portion with an elongated slot $3^c$ through which traverses a bolt $3^d$ depending from the support $1^x$. Each bolt $3^d$ preferably loosely carries a device $3^e$ having a shoe slidably fitting the side walls of the slot $3^c$ and flanges extending beyond the side walls of the slot and engaging the lower face of the plate $3^b$ to prevent upward tilting of the seat, the device $3^e$ being removably held on the bolt $3^d$ by a nut $3^f$. As the slots $3^e$ are parallel, the walls thereof will guide the bolts $3^d$ during adjustment of the seat.

The adjustment mechanism 4 consists of an operating means 5 and a set or sets of co-operable adjusting devices 5' actuated and controlled by the operating means 5. The operating means preferably comprises the following instrumentalities:

6 indicates a casting suitably secured, as by devices $6^a$, to the under surface of the base $1^x$, that is, the lower side of the front section of the frame, and movable therewith, and preferably disposed substantially midway between the ends of the section. The casting 6 has a base portion $6^b$ and depending brackets 7, 8, provided with hollow bosses 9 forming bearings for a shaft 10. 11 is a separate casting secured by cap screws 12 or otherwise to the inner end of the casting 6, the walls of these castings being fashioned or shaped to form between them a box or casing for a worm 13 and a worm gear 14 in mesh therewith, the former being secured to the shaft 10 and the latter being secured to a shaft 15. The end wall of the casting 11 has a thickened portion bored out, as shown at 16, to form a bearing for the inner end of the shaft 10, the worm 13 being mounted on the shaft 10 between the bearing 16 and adjacent bearing 9; whereas the abutting edges of the castings 6 and 11 have related semi-circular portions which form bearings for the opposite ends of the shaft 15. The shaft 10 extends outwardly through an opening formed in the section $3^{a'}$, as shown in Fig. 4, and carries on its free end a crank or handle 17 by means of which it may be readily rotated in either direction. The shaft 10 is preferably sectional, the adjoining ends of the sections being connected preferably by male and female elements. As shown, the inner end of the outer section engages the inner bearing 9 to prevent inward movement of the shaft and a collar 18 fixed to the outer shaft section engages the inner side of the outer bearing 9 to prevent outward movement of the shaft.

Where the operating means is mounted centrally of the seat 1, I prefer to provide at either side thereof a set of co-operable devices 5' arranged to be actuated simultaneously by the shaft 15 when rotated in either direction, but in some other arrangement one set may be sufficient. In the illustrated arrangement both side portions of the seat 1 are moved and therefore any tendency to wedge either side or end of the seat is avoided. As the sets of adjusting devices 5' are similar in construction, I will refer to but one thereof, as follows: 19, 20, indicate a pair of superposed plates having face to face engagement and slidable one relative to the other. In the preferred arrangement, the upper plate 20 slidably bears upon the lower plate 19 and therefore the latter sustains a portion of the weight of the seat, but this is not essential, as the seat may be slidably supported at its front portion on the support 3 rather than by means of the plates 19, 20. The lower plate 19 is provided with a flange $19^a$ and a guide and stiffening wall $19^b$ at its outer end. The flange $19^a$ is secured to the front supporting section $3^{a'}$ by bolts 21. The upper plate 20 is flanged upwardly at its front and rear edges and downwardly along its outer side edge as shown at 20'. The front and rear flanges are preferably secured to the front section of the seat base $1^x$ as shown in Fig. 6 whereas the side flange 20' co-operates with the wall $19^b$ to guide the front portion of the seat. Each plate 19, 20, is provided with a guide wall or walls disposed at an angle to the guide wall or walls on the other plate and disposed in a plane which intersects the latter. The guide wall or walls on each plate is provided by forming therein an elongated slot 22, preferably straight from end to end, at least one (either one) of the slots being disposed at a suitable angle (preferably 30°) to an imaginary line extending at right angles to the direction in which the seat moves when adjusted. As it is desired to adjust the seat toward or from the foot controls A, this imaginary line extends transversely of the vehicle B. By preference, both slots 22 are inclined at the same angle, but in reverse relation and one intersects the other so that a portion of one always registers with a portion of the other in any and all positions of the seat. 23 indicates a device, such as a bolt or shaft extending through the slots 22, 22, and rotatably supported at its opposite ends in the bifurcations of a thrust member 24, the device 23 being headed at one end and provided at its opposite end with threads to take a nut 25, whereby the device is supported in the bifurcations, and held against endwise movement. 26 indicates slides, such as rollers loosely mounted on the device 23 having their inner ends in face to face relation and engaging respectively with and adapted to slide or roll on the side walls of the adjacent slots 22, the body portions of the rollers having a diameter slightly less than the width of the slots. As shown, the rollers are flanged on their opposite outer ends and these flanges slidably engage the exposed faces of the plates 19, 20, and serve to space the bifurcations of the thrust member 24 from the plates 19, 20, to avoid friction. As shown, the body portion of each roller 26 has a width substantially equal to the thickness of the adjacent plate and the length of the device 23 is such as to maintain the body portions of the rollers in the slots 22 so that these portions may engage the sides thereof throughout their movement in the slots in either direction; and the flanges of the lower slide 26 engage the plate 19 to prevent upward tilting of the front portion of the seat. The inner end of the thrust member is formed with a longitudinally extending threaded opening 27 in and through which is threaded a feed screw 28. The inner end of the feed screw is connected, preferably by a universal joint 29 to the adjacent end of the shaft 15, whereby rotation of the latter will rotate the feed screw 28, which in turn will move the thrust member 24 endwise outwardly or inwardly according to the direction of rotation of the shaft.

The slots 22 being inclined or at angles relative to each other and the device 23 extending through both thereof, and the plates 19, 20, being held against endwise movement, a force exerted upon the device 23 along said imaginary line or a line substantially parallel thereto will cause the device through its co-action against the side edges of the slots, to effect relative movement between the plates 19, 20, at right angles to said imaginary line. As the lower plate 19 is fixed to the support 3 and the upper plate 20 is fixed to the movable seat 1, movement of the device 23 by the thrust member 24, will move the plate 20 relative to the plate 19 and hence effect adjustment of the seat 1.

Fig. 3 shows the device 23 midway between the ends of both slots, from which position the seat may be adjusted by rotation of the shaft 10 in either direction; for example, rotation of the feed screw 28 in a direction to move the thrust member 24 outwardly will cause the device 23 through its engagement, or the engagement of the slide thereon with the adjacent side edges of the outer portions of the slots, to move the plate 20 in the direction of the arrow x in Fig. 3, whereby the seat 1 will be adjusted toward the foot controls A; or rotation of the feed screw 28 in a direction to move the thrust member inwardly will cause the device 23 through its engagement or the engagement of the slide thereon, with the adjacent side edges of the inner portions of the slots 22, to move the plate 20 in the same direction. Following either of said adjustments rotation of the shaft 10 in the opposite direction will effect adjustment away from the foot controls A. The adjustment in either direction from the position shown in Fig. 3 may be continued until the device 23 engages the end walls of the slots 22.

By increasing the inclination of the slots 22 or making them longer, or by increasing both their inclination and length, or by curving their outer portions laterally, the range of adjustment of the seat can be increased.

In the form of construction shown, the slots 22 are disposed in symmetrical relation to the imaginary line, or from equal angles therewith so that the movement of the device 23 is along this line, and by preference the axis of the shaft 15 is coincident to this line, but by providing a universal joint, between the shaft 15 and each thrust member, as shown at 29, the shaft 15 need not be so disposed; in fact by the use of a universal joint, the operating means 5 may be mounted on the support 3; furthermore, where the slots are otherwise disposed, for example, as where the slot 22 in one plate only is inclined, the universal joint 29 permits of the lateral movement of the device 23 as it traverses such slots.

It will be noted that the operating means 5 in my form of construction are carried by and move with the seat. Accordingly, the handle 17 is always accessible and bears the same relation to the front portion of the seat in any position of adjustment thereof.

It will also be noted that the plates 19, 20, bear a face to face relation and the upper one slides on the lower one. As the force applied to the device 23 acts against the side walls of the slots 22, and in the plane of the plates and at right angles to these walls, any tendency to increase the friction between them is eliminated. For this reason and for the further reason that the slides 26 are interposed between the device 23 and the side walls of the slots, I have found that the seat is readily adjusted by the operation of the handle 17 even when occupied by two or more persons. By providing two slides 26, in engagement with the plates 19, 20, respectively and rotatable independently of each other on the device 23, they are free to rotate in opposite directions as they traverse the slots.

To those skilled in the art to which my invention relates, many changes in construction and widely different embodiments and applications of my invention will suggest themselves without departing from the spirit and scope thereof. My disclosures and the description herein are purely illustrative and are not intended to be in any sense limiting.

What I claim is:

1. In mechanism of the class described, the combination with a support and a seat superposed on said support and movable relative thereto, of a set of cooperable devices comprising a pair of plates disposed parallel to each other and fixed to said support and movable seat, respectively, and having guides disposed at angles to and intersecting each other, and an element adapted to simultaneously engage said guides and move longitudinally thereof, and means for moving said element in a direction at an angle to the direction of movement of said movable seat.

2. In mechanism of the class described, the combination with a support and a seat superposed on said support and movable relative thereto, of a set of cooperable devices comprising a pair of plates disposed parallel to each other and fixed to said support and movable seat, respectively, and having guides disposed at angles to and intersecting each other, an element common to said guides and a pair of slides mounted on said element and having engagement with said guides, respectively, and means for moving said element in a direction at an angle to the direction of movement of said seat.

3. In mechanism of the class described, the combination with a support and a seat superposed on said support and movable relative thereto, of a set of cooperable devices comprising a pair of plates disposed parallel to each other and fixed to said support and movable seat, respectively, and having guides disposed at angles to and intersecting each other, and an element adapted to simultaneously engage said guides and move longitudinally thereof, and means for moving said element in a direction at an angle to the direction of movement of said movable seat, said moving means including a thrust member carrying said element at one end and an operating means for operating it.

4. In mechanism of the class described, the combination with a support and a seat superposed on said support and movable relative thereto, of a set of cooperable adjusting devices comprising plates disposed in parallel relation, one fixed to said support and the other fixed to said seat and each formed with an elongated slot disposed at an angle to and intersecting the slot in the other plate, an element extending through said slots and adapted to engage the side walls thereof, and means for moving said element in a direction at an angle to the direction of movement of said seat to effect traverse of said element through said slots.

5. In mechanism of the class described, the combination with a support and a seat superposed on said support and movable relative thereto, of a set of cooperable adjusting devices comprising plates disposed in parallel relation, one fixed to said support and the other fixed to said seat and each formed with an elongated slot disposed at an angle to and intersecting the slot in the other plate, an element extending through said slots and a pair of slides mounted on said element and having engagement with the side walls of said slots, respectively, and means for moving said element in a direction at an angle to the direction of movement of said movable seat to effect traverse of said element through said slots.

6. In mechanism of the class described, the combination with a support and a seat superposed on said support and movable relative thereto, of a set of cooperable adjusting devices comprising plates disposed in parallel relation, one fixed to said support and the other fixed to said seat, and formed with elongated slots disposed at angles to and intersecting each other and forming equal angles with an imaginary line extending at an angle to the direction of movement of said movable seat and an element extending through said slots at their point of intersection, and means for moving said element to effect traverse thereof longitudinally of said slots.

7. In mechanism of the class described, the combination with a support and a seat superposed on said support and movable relative thereto, of a set of cooperable devices comprising a pair of superposed plates, one fixed to said support and the other fixed to said movable seat and slidably engaging the first mentioned plate, said plates having guides disposed at angles to and intersecting each other, one of said guides being inclined to the direction of movement of said movable seat, and an element adapted to simultaneously engage said guides and move longitudinally thereof, and means for moving said element in a direction at an angle to the direction of movement of said movable seat.

8. In mechanism of the class described, the combination with a support and a seat superposed on said support and movable relative thereto, of a set of cooperable devices comprising a pair of superposed plates, one fixed to said support and the other fixed to said movable seat and slidably engaging the first mentioned plate, said plates having guides disposed at angles to and intersecting each other, one of said guides being inclined to the direction of movement of said movable seat, an element common to said guides and a pair of slides loosely mounted on said element and having engagement with said guides, respectively, and means for moving said element in a direction at an angle to the direction of movement of said seat.

9. In mechanism of the class described, the combination with a support and a seat superposed on said support and movable relative thereto, of a set of cooperable devices comprising a pair of superposed plates, one fixed to said support and the other fixed to said movable seat and slidably engaging the first mentioned plate, said plates having guides disposed at angles to and intersecting each other and an element adapted to simultaneously engage said guides and move longitudinally thereof, and means for moving said element in a direction at an angle to the direction of movement of said movable seat, said moving means including a thrust member carrying said element at one end and an operating means for operating it.

10. In a mechanism of the class described, the combination with a support and a seat superposed on said support and movable relative thereto, of a set of cooperable devices comprising a pair of superposed plates, one fixed to said support and the other fixed to said movable seat and slidably engaging the first mentioned plates, said plates having guides disposed at angles to and intersecting each other and an element adapted to simultaneously engage said guides and move longitudinally thereof, and means for moving said element in a direction at an angle to the direction of movement of said movable seat, said moving means comprising a thrust member carrying said element at one end, a feed screw threaded into the opposite end of said thrust member and means for rotating said screw.

11. In mechanism of the class described, the combination with a support and a seat superposed on said support and movable relative thereto, of a set of cooperable adjusting devices comprising upper and lower plates, the lower plate being fixed to said support and the upper plate being fixed to said seat and each formed with an elongated slot, one slot being disposed at an angle to and intersecting the slot in the other plate and an element extending through said slots and adapted to engage the side walls thereof, and means for moving said element in a direction at an angle to the direction of movement of said seat to effect traverse of said element through said slots.

12. In mechanism of the class described, the combination with a support and a seat superposed on said support and movable relative thereto, of a set of cooperable devices comprising a pair of plates disposed parallel to each other and fixed to said support and movable seat, respectively, and having guides disposed at angles to and intersecting each other and an element adapted to simultaneously engage said guides and move longitudinally thereof, and means for moving said element in a direction at an angle to the direction of movement of said movable seat, said moving means being mounted on said movable seat.

13. In mechanism of the class described, the combination with a support and a seat superposed on said support and movable relative thereto, of a set of cooperable adjusting devices comprising plates disposed in parallel relation, one fixed to said support and the other fixed to said seat and each formed with an elongated slot disposed at an angle to and intersecting the slot in the other plate, an element extending through said slots and adapted to engage the side walls thereof, and means for moving said element in a direction at an angle to the direction of movement of said seat to effect traverse of said element through said slots, said moving means being mounted on said movable seat.

14. In mechanism of the class described, the combination with a support and a seat superposed on said support and movable relative thereto, of guides between the end portions of said member and said support, a set of cooperable adjusting devices comprising plates disposed in parallel relation, one fixed to said support and the other fixed to said seat and each formed with an elongated slot disposed at an angle to and intersecting the slot in the other plate and an element extending through said slots, and means for moving said element in a direction at an angle to the direction of movement of said movable seat to effect traverse of said element through said slots.

15. In mechanism of the class described, the combination with a support and a member movable relative thereto, of guides between said member and support comprising a wall on said support formed with a slot and a device depending from said member and carrying a flanged slide fitting said slot, the flange engaging the lower side of the wall to prevent tilting, a set of cooperable adjusting devices comprising upper and lower plates, the lower one being fixed to said support and the upper one being fixed to said member and each formed with an elongated slot disposed at an angle to and intersecting the slot in the other plate, an element extending through the said slot and a pair of slides mounted on said element and having engagement with the side walls of said slot, respectively, the lower slide being flanged and engaging the plate to prevent upward movement of said member, and means for moving said element in a direction to effect traverse of said slides through said slots.

16. In mechanism of the class described, the combination with a support and a member movable relative thereto, of guides between said members and support comprising a wall on said support formed with a slot and a device depending from said member and carrying a flanged side fitting said slot, the flange engaging the lower side of the wall to prevent tilting, a set of co-operable adjusting devices comprising upper and lower plates, the lower one being fixed to said support and the upper one being fixed to said member and each formed with an elongated slot disposed at an angle to and intersecting the slot in the other plate, an element extending through the said slot and a pair of rollers rotatably mounted on said element and having engagement with the side walls of said slots, respectively, the lower roller being flanged and engaging the plate to prevent upward movement of said member, and means for moving said element in a direction to effect traverse of said rollers through said slots.

17. In mechanism of the class described, the combination with a support and a seat superposed on said support and movable relative thereto, of a set of co-operable devices comprising a pair of superposed plates, one fixed to said support and the other fixed to said movable seat and slidably engaging the first mentioned plate, said plates having guides disposed at angles to and intersecting each other, one of said guides being inclined to the direction of movement of said movable seat, an element common to said guides and a pair of rollers loosely mounted on said element and having engagement with said guides, respectively, and means for moving said element in a direction at an angle to the direction of movement of said seat.

In testimony whereof, I have hereunto subscribed my name.

HUGH C. SEELEY.